US006620469B2

(12) United States Patent
Totani et al.

(10) Patent No.: US 6,620,469 B2

(45) **Date of Patent: *Sep. 16, 2003**

(54) INK JET RECORDING SHEET COMPRISING A WATER REPELLENT UNDERLAYER

(75) Inventors: Kazuo Totani, Ichikawa (JP); Naonobu Sugiyama, Ichikawa (JP); Kazuaki Ohshima, Yokohama (JP)

(73) Assignee: Oji Paper Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,208

(22) Filed: Aug. 25, 1997

(65) Prior Publication Data

US 2001/0009712 A1 Jul. 26, 2001

(30) Foreign Application Priority Data

Aug. 27, 1996 (JP) ........................................... 8-225413

(51) Int. Cl.[7] ................................................ B32B 3/00

(52) U.S. Cl. ................................... 428/32.34; 428/32.1

(58) Field of Search ................................ 428/195, 198, 428/212, 304.4, 304.8, 317.3, 331, 32.1, 32.34; 347/100, 105

(56) References Cited

U.S. PATENT DOCUMENTS

| | | | | | |
|---|---|---|---|---|---|
| 4,642,247 | A | * | 2/1987 | Mouri et al. | 427/214 |
| 4,902,577 | A | * | 2/1990 | Butters et al. | 428/483 |
| 5,185,213 | A | * | 2/1993 | Fujita et al. | 428/500 |
| 5,302,437 | A | * | 4/1994 | Idei et al. | 428/195 |
| 5,372,884 | A | * | 12/1994 | Abe et al. | 428/331 |
| 5,472,757 | A | * | 12/1995 | Ogawa et al. | 428/40 |
| 5,662,997 | A | * | 9/1997 | Onishi et al. | 428/331 |
| 5,747,148 | A | * | 5/1998 | Warner et al. | 428/212 |
| 5,759,673 | A | * | 6/1998 | Ikezawa et al. | 428/198 |

FOREIGN PATENT DOCUMENTS

| | | | | | |
|---|---|---|---|---|---|
| EP | 233703 A2 | | 8/1987 | | |
| EP | 650850 A2 | | 5/1995 | | |
| EP | 663300 A1 | | 7/1995 | | |
| EP | 671282 A2 | | 9/1995 | | |
| EP | 707977 A1 | | 4/1996 | | |
| JP | 62-158084 | | 7/1987 | | |
| JP | 63-057227 | * | 3/1988 | | B41M/5/00 |
| JP | 1-225585 | | 9/1989 | | |
| JP | 5-51470 | | 3/1993 | | |

OTHER PUBLICATIONS

SNOWTEX Product Bulletin, "Types of Snowtex," retrieved from snowtex website (www.snowtex.com), site visited Aug. 9, 2002.*

Machine Translation, JP–05–051470 (Nakahara, et al.).*

* cited by examiner

*Primary Examiner*—Bruce H. Hess
*Assistant Examiner*—Michael E. Grendzynski
(74) *Attorney, Agent, or Firm*—Arent Fox Kintner Plotkin & Kahn, PLLC

(57) ABSTRACT

An ink jet recording sheet having a high water resistance and capable of recording thereon clear ink images includes a substrate polymeric film or sheet; an undercoat layer formed on the substrate and including a polymeric binder having a glass transition temperature of 50° C. or less and optionally pigment particles having an oil absorption of 250 ml/100 g or less and/or an aspect ratio of 2.0 to 100.0; and an ink receiving layer including a pigment and a polymeric binder.

9 Claims, No Drawings

INK JET RECORDING SHEET COMPRISING A WATER REPELLENT UNDERLAYER

BACKGROUND OF THE INVENTION (1) Field of the Invention

The present invention relates to an ink jet recording sheet. More particularly, the present invention relates to an ink jet recording sheet which can be processed and recorded on to the same extent as conventional wood-free paper sheets and coated paper sheets, can record thereon colored ink images with excellent clarity and satisfactory dot quality, and has an excellent water resistance.

(2) Description of Related Art

Due to a significant development in the performance, for example, the printing speed and the resolving power, of ink jet type printers and the saturation of the recorded colored images, recording materials are required to have enhanced performances, for example, high ink absorption rate, high ink absorption capacity, regulated ink spreading property, etc., and thus various coated paper type ink jet recording sheets each having an ink receiving coating layer formed on a surface thereof have been developed.

For example, Japanese Unexamined Patent Publication No. 62-158,084 discloses an ink jet recording medium having an ink receiving layer containing fine synthetic silica particles and exhibiting high ink-absorbing property, color-reproducibility and color density. Namely, to satisfy the above-mentioned requirements, the ink jet recording sheet has a coating layer comprising, as a principal component, a white pigment such as the fine synthetic silica particles, having an excellent ink-absorbing property, and formed on a surface of a substrate comprising, as a principal component, cellulosic pulp.

Also, due to an expansion of use of ink jet printers, the use of the ink jet recording sheets has expanded from conventional documents, for example, office documents to colored advertising materials, particularly, advertising materials at the point of sale (POS advertising materials).

The ink jet recording system needs no printing plate and thus is definitely different from a printing system. Therefore, the ink jet recording system is advantageous in that a small amount of recording can be carried out and the cost is low.

The conventional ink jet recording sheets have a substrate sheet formed from a conventional cellulosic pulp, and thus are disadvantageous in that the recording sheets have a low water resistance and are easily damaged when wetted with water. Also, even when a water-resistance-enhancing treatment is applied to the substrate paper sheets, the resultant recording sheets are still unsatisfactory in resistances to elongating, wrinkling and curling phenomena. Namely, the conventional ink jet recording sheets are unsatisfactory in the water resistance thereof.

Japanese Unexamined Patent Publication No. 64-36,478 discloses an ink jet recording sheet comprising a substrate formed from a film comprising, as a principal component, a polyolefin resin, and a hydrophobic ink-absorbing and fixing layer formed on the substrate, and exhibiting an excellent water resistance. This type of ink jet recording sheet has an excellent water resistance and is usable for POS advertisements.

This type of ink jet recording sheet is usable only for ink jet printers using an oily ink. Namely, the above-mentioned ink jet recording sheet is not usable for ink jet printers using an aqueous ink. Also, the hydrophobic ink-absorbing and fixing layer does not always exhibit a high water resistance.

Also, even when the water-resistant film comprising, as a principal component, a polyolefin resin is used as a substrate sheet, when a conventional ink receiving layer is formed on the substrate sheet, and wetted with water droplets and rubbed with a finger or a pen, the ink receiving layer is easily peeled off at the interface between the ink receiving layer and the substrate sheet, due to a poor water resistance thereof. As mentioned above, an ink jet recording sheet having an aqueous ink-receiving layer with a satisfactory water resistance has not yet been supplied.

Japanese Unexamined Patent Publication No. 1-225,585 and No. 5-051,470 discloses an ink jet recording sheet having an undercoat layer formed between a substrate sheet and an ink-receiving layer. The undercoat layer of the above-mentioned publications is an ink-holding layer or an ink-receiving layer which cannot enhance the water-resistance of the recording sheet.

SUMMARY OF THE INVENTION

An object of the present invention is to provide an ink jet recording sheet capable of being recorded with aqueous ink images with high quality at a high speed by an ink jet recording printer and having an excellent water resistance.

The above-mentioned object can be attained by the ink jet recording sheet of the present invention, which comprises a substrate comprising a polymeric film or sheet; an ink receiving layer comprising a pigment and a polymeric binder; and an undercoat layer formed between the substrate and the ink receiving layer and comprising a polymeric binder having a glass transition temperature of 50° C. or less.

In the ink jet recording sheet of the present invention, the pigment for the ink receiving layer may comprise a plurality of fine amorphous silica particles.

In the ink jet recording sheet of the present invention, the undercoat layer may further comprise a pigment.

In this case, the pigment for the undercoat layer preferably has an oil absorption of 250 ml/100 g or less, determined in accordance with Japanese Industrial Standard K 5101.

In the ink jet recording sheet of the present invention, the polymeric binder for the undercoat layer preferably comprises a water-dispersible resin having a glass transition temperature of 50° C. or less.

Also, in the ink jet recording sheet of the present invention, the polymeric binder in the undercoat layer may be cross-linked with a cross-linking agent.

In the ink jet recording sheet of the present invention, the undercoat layer is preferably in an amount of 0.2 to 15.0 $g/m^2$.

In the ink jet recording sheet of the present invention, the polymeric film for the substrate is preferably selected from biaxially oriented films.

In the ink jet recording sheet of the present invention, the polymeric binder of the undercoat layer preferably has a glass transition temperature of −30° to 50° C.

In the ink jet recording sheet of the present invention, the undercoat layer is preferably in an amount of 0.5 to 8.0 $g/m^2$.

In the ink jet recording sheet of the present invention, the cross-linking agent for the undercoat layer preferably comprises at least one isocyanate compound.

In the ink jet recording sheet of the present invention, the undercoat layer preferably exhibits a water repellency of R6 or more determined in accordance with Japanese Industrial Standard P 8137.

In the ink jet recording sheet of the present invention, the polymeric film or sheet for the substrate is preferably selected from biaxially oriented films comprising an inorganic pigment and a thermoplastic resin.

In the ink jet recording sheet of the present invention, the polymeric binder contained in the undercoat layer and having a glass transition temperature of 50° C. or less, may be derived from an aqueous acrylic resin emulsion.

Further, in the ink jet recording sheet of the present invention, the undercoat layer preferably comprises pigment particles, more preferably inorganic pigment particles, having an aspect ratio, which is a ratio of major axis length to minor axis length of the particles, of 2.0 to 100.0.

DESCRIPTION OF THE PREFERRED EMBODIMENTS

The ink jet recording sheet of the present invention comprises a substrate formed from a polymeric film or sheet, an undercoat layer formed on a surface of the substrate and comprising a polymeric binder having a glass transition temperature of 50° C. or less and an ink receiving layer formed on the undercoat layer and comprising fine amorphous silica particles and a hydrophilic polymeric binder.

The ink jet recording sheet of the present invention is characterized by the specific undercoat layer formed between the substrate and the ink receiving layer.

In a conventional ink jet recording sheet wherein an ink receiving layer is directly formed on a surface of a substrate formed from a biaxially oriented polymeric film or sheet, it is difficult to provide an ink receiving layer firmly fixed to the substrate, because the ink receiving layer is required to have a high aqueous ink-absorption. Particularly, when the ink jet recording sheet is wetted with water, the water penetrates into the interface between the substrate and the ink receiving layer through the ink receiving layer and cross-sections of the recording sheet, and the ink receiving layer is easily peeled off from the substrate. Namely, it is difficult to provide a water-resistant ink receiving layer. However, when the undercoat layer of the present invention is formed between the substrate and the ink receiving layer, the undercoat layer can firmly adhere not only to the substrate but also to the ink receiving layer, and thus the ink receiving layer is firmly bonded to the substrate through the undercoat layer. Therefore, water penetrates with difficulty into the interface between the substrate and the ink receiving layer. Even if water can penetrate into the interface, the penetrating water does not cause the bonding between the substrate and the ink receiving layer, through the undercoat layer, to be degraded. Accordingly, the ink receiving layer can exhibit an enhanced resistance to water.

In the ink jet recording sheet of the present invention, the substrate is formed from a polymeric film or sheet, especially a water-resistant polymeric film or sheet. The polymeric film may be selected from thermoplastic polymeric films comprising, as a principal component, at least one member selected from polyolefin resins, for example, polyethylene, polypropylene, ethylene-propylene copolymers and ethylene-vinyl acetate copolymers, polystyrene and acrylic acid ester copolymers. The polymeric sheet may be selected from synthetic paper sheets produced from the above-mentioned resins.

When the thermoplastic resin is mixed with fine inorganic particles, the mixture is formed into a film and the film is oriented in two directions, a synthetic paper-like sheet or layer having a hand similar to that of a natural paper sheet is obtained. In the present invention, the substrate preferably comprises a multilayered sheet comprising at least one of synthetic paper-like layer. For example, the multi-layered synthetic paper sheet is preferably a two or three-layered sheet comprising a core layer and one or two synthetic paper-like surface layers, or a three to five-layered sheet having one or two uppercoat layers formed on the synthetic paper-like layers of the above-mentioned two or three layered sheet. This type of multi-layered sheet is also referred to as a film-method synthetic paper sheet.

The fine inorganic particles to be mixed into the thermoplastic resin include, for the core layer and the synthetic paper-like layer, calcium carbonate, calcined clay, diatomaceous earth, talc and silica particles having an average particle size of 20 μm or less, and for the uppercoat layer, calcium carbonate, titanium dioxide and barium sulfate particles. The fine inorganic particles are present preferably in an amount of 8 to 65% in the synthetic paper sheet. If the content of the inorganic particle is too small, the resultant oriented sheet may have an unsatisfactory paper-like hand, appearance and ink absorption. Also, if the content of the inorganic particles is too large, the resultant sheet may be unsatisfactory in mechanical strength.

The biaxially oriented film for the substrate may be selected from commercially available thermoplastic films known as synthetic paper sheets. These films preferably have a thickness of 15 to 20 μm and a basis weight of 10 to 150 g/m$^2$.

In the ink jet recording sheet of the present invention, the undercoat layer to be formed on the substrate comprises a polymeric binder having a glass transition temperature of 50° C. or less and optionally a pigment and/or another additive.

The polymeric binder for the undercoat layer comprises at least one member selected from latices of water-insoluble polymers, for example, conjugated diene polymers such as styrene-butadiene copolymers and methyl methacrylate-butadiene copolymers, acrylic polymers, for example, homopolymers and copolymers of acrylic acid esters and methacrylic acid esters, vinyl polymers, for example, ethylene-vinyl acetate copolymers; and modification reaction products of the above-mentioned polymers and copolymers, having modification functional group, for example, carboxyl and/or cationic groups; water-soluble or dispersible thermosetting resins, for example, melamine-formaldehyde resins and urea-formaldehyde resins; water-insoluble adhesive resins, for example, malic anhydride copolymer resins, polyacrylamide resins, polymethyl methacrylate resins, polyurethane resins, unsaturated polyester resins, polyvinyl butyral resins, and alkyd resins; and water-soluble polymers, for example, polyvinyl alcohols and cellulose derivatives, each having a glass transition temperature of 50° C. or less, preferably 30° C. or less, more preferably 10° C. or less. The undercoat layer contributes to enhancing the bonding strength between the substrate and the ink receiving layer.

There is no lower limitation to the glass transition temperature of the polymeric binder. Usually, in the process for producing the ink jet recording sheet, when the undercoat layer is formed on the substrate, and the resultant laminate sheet is wound up and stored before the ink receiving layer-coating step, the polymeric binder for the undercoat layer preferably has a glass transition temperature of 50° C. or less but not less than −30° C. This type of the polymeric binder does not cause the resultant wound laminate sheet to exhibit blocking phenomenon.

For the undercoat layer, the polymeric binder is preferably selected from water-dispersible polymers having a high water resistance. If water-soluble resins are used for the undercoat layer, the water-soluble resins in the resultant undercoat layer are preferably cross-linked, to make them water-insoluble.

Generally, the acrylic polymer latices are useful for forming an undercoat layer having an excellent water resistance. When the acrylic polymer latices are used as the polymeric binder, the resultant undercoat layer after drying exhibits an excellent barrier performance to water, and thus is preferably employed.

If the glass transition temperature of the polymeric binder is more than 50° C., the resultant undercoat layer exhibits an unsatisfactory bonding strength to the substrate (for example, a polyolefin film or sheet) and the ink receiving layer, and an unsatisfactory water resistance because the undercoat layer exhibits an insufficient bonding strength to the substrate comprising, for example, a polyolefin resin, and to the ink receiving layer. Also, if the glass transition temperature of the polymeric binder is less than −30° C., the resultant undercoat layer may exhibit a sticking property. In this case, when a laminate sheet prepared by coating a substrate sheet with the undercoat layer is wound around a roll, before coating the ink receiving layer, the wound laminate sheet layers may be adhered to each other to exhibit a blocking phenomenon. Therefore, in this case, the polymeric binder for the undercoat layer preferably has a glass transition temperature of −30° C. or higher. However, when a coating machine by which the undercoat layer-coating step and the ink receiving layer-coating step can be successively carried out is used, there is no lower limitation to the glass transition temperature of the polymeric binder.

The polymeric binder is preferably present in an amount of 10 to 100% by weight, more preferably 20 to 80% by weight, based on the total solid weight of the undercoat layer.

When the polymeric binder having a sticking property is used in too large an amount, and the resultant undercoat layer-coated laminate is wound up around a roll, the above-mentioned blocking phenomenon may occur. Also, if the polymeric binder is used in too small an amount, the bonding strength of the resultant undercoat layer to the substrate sheet and the ink receiving layer may be insufficient, and thus the resultant ink jet recording sheet may exhibit an unsatisfactory water resistance. Also, the resultant undercoat layer exhibits an insufficient water-repellency and a reduced water resistance, and thus water can penetrate into the interface between the undercoat layer and the substrate through the undercoat layer.

To obtain an ink jet recording sheet having an excellent water resistance, preferably, the undercoat layer exhibits a water repellency of R6 or more determined in accordance with Japanese Industrial Standard (JIS) P 8137.

An undercoat layer which does not cause the blocking phenomenon can be obtained by cross-linking the polymeric binder with a cross-linking agent even when the polymeric binder has a low glass transition temperature. In this connection, it is assumed that by cross-linking the polymeric binder with the cross-linking agent, and the resultant undercoat layer surface exhibits an increased hardness and no sticking property.

The cross-linking agent for the undercoat layer comprises at least one member selected from, for example, isocyanate compounds, for example, polyisocyanates, polymethylene-polyphenyl isocyanates, toluylenediisocyanate, diphenylmethanediisocyanate and hexamethylenediisocyanate; titanium chelate compounds, for example, tetra-iso-propoxy-bis(triethanolamine) titanate, tetrapropyltitanate, and triethanolaminetitanate; alkoxysilane compounds, for example, trimethoxysilane, dimethyldimethoxysilane, methyltrimethoxysilane, methyldimethoxysilane, trimethylethoxysilane, dimethyldiethoxysilane, methyltriethoxysilane, and methyldiethoxysilane; silanol compounds, for example, diphenylsilanediol; vinyl silane compounds, for example, vinyltrimethoxysilane and vinyltriethoxysilane; sulfur, organic sulfur compounds, oxime compounds and nitroso compounds. Among the above-mentioned compounds, the isocyanate compounds are effective as a cross-linking agent for acrylic resin emulsions and are preferably used for the present invention. These cross-linking agent can be employed alone or in a mixture of two or more thereof.

The cross-linking agent is used in an amount of 0.2 to 10% by dry weight based on the dry weight of the polymeric binder for the undercoat layer. If the amount of the cross-linking agent is too small and is used for a polymeric binder having a glass transition temperature of lower than −30° C., the resultant undercoat layer may exhibit an insufficient resistance to blocking. Also, if the amount of the cross-linking agent is too large, the cross-linkage of the undercoat layer may be too high and the resultant undercoat layer may exhibit too high a hardness.

The pigment usable for the undercoat layer may be selected from inorganic pigments, for example, calcium carbonate, clay, calcined clay, kaolin, diatomaceous earth, talc, aluminum oxide, silica, white carbon, magnesium aluminosilicate, magnesium silicate, magnesium carbonate, barium sulfate, titanium oxide, aluminum hydroxide, and magnesium hydroxide; and organic pigments, for example, styrene homopolymer and copolymer resins and arylic acid ester homopolymer and copolymer resins.

In a preferable embodiment of the ink jet recording sheet of the present invention, the pigment usable for the undercoat layer comprises a plurality of pigment particles having an aspect ratio, which refers to as a ratio of major axis length to minor axis length of the pigment particles, of 2.0 to 100.0, more preferably 2.0 to 50.0, still more preferably 2.0 to 7.0, determined according to Japanese Industrial Standard R 1600. Usually, the major axis corresponds to a width of the primary particles and the minor axis corresponds to a thickness of the primary particles of the pigment.

The preferable pigment for the undercoat layer are inorganic pigments, particularly calcium carbonate pigments.

If the aspect ratio of the pigment particles is too small, the resultant undercoat layer may exhibit an insufficient bonding strength to the ink receiving layer and to the substrate and a water resistant insufficient to display the resultant ink images over a long period of time. Also, if the aspect ratio is too large, the resultant undercoat layer may exhibit an unsatisfactory surface strength. In this case, when an overlaminate sheet which is a transparent resin film having a tack layer, is coated on the ink image-recorded surface of the ink jet recording sheet, and rubbed at the surface thereof, the ink image-recorded layer may be separated together with the overlaminate sheet from the undercoat layer; even when no water is applied to the undercoat layer. Also, when the ink image-recorded surface of the ink jet recording sheet, especially in a large cut size, for example, an AO size, is overcoated with the overlaminate sheet, the resultant laminate sheet is not suitable for displaying over a long time period, while the ink jet recording sheet can be employed under usual conditions, and no problem occurs. Further, if the aspect ratio is too large, the surface strength of the resultant undercoat layer is low, and thus the surface of the undercoat layer may be damaged or cut by applying light force, for example, a light rubbing with a finger nail, to the surface, even when no water is applied to the undercoat layer. Therefore, the resultant undercoat layer is difficult to handle. Accordingly, the aspect ratio of the pigment particles for the undercoat layer is preferably in the range of from 2.0 to 100.0, more preferably 2.0 to 7.0.

The reason for the effect of the aspect ratio of the pigment particles is not clear. However, it is assumed that when the pigment particles are in the form of a flat thin plate having an aspect ratio of 2.0 or more, and the pigment particle-containing coating liquid is coated on a surface of the substrate, the flat thin particles of the pigment are accumulated on each other in flat face-to-flat face manner so as to provide a plurality of fine pores in the undercoat layer. When a coating liquid for the ink receiving layer is coated on the resultant undercoat layer, the fine pores allow the coating liquid for the ink receiving layer to penetrate thereinto so that the resultant ink receiving layer is firmly bonded to the undercoat layer, and the interface between the undercoat layer and the ink receiving layer exhibits an enhanced water resistance. If the aspect ratio is less than 2.0, it is assumed that the pigment particles are in the form close to a cube, and thus the fine pores cannot be formed in a sufficient number in the resultant undercoat layer, and the resultant undercoat layer cannot exhibit a satisfactory bonding strength to the ink receiving layer and a sufficient water-resistance. If the aspect ratio is more than 7.0 but not exceeding 100.0, the pigment particles may be in the form of a plate or rod, and may exhibit a mechanical strength slightly lower than that of the pigment particles having an aspect ratio of 7.0 or less and in the form of a spindle. If the aspect ratio is more than 100.0, the pigment particles may be in the form of a needle, and may exhibit a reduced mechanical strength. Generally, when the pigment particles are in the form of a weaving spindle, plate or rod, the aspect ratio of the particles is in the range of from 2.0 to 7.0. Therefore, the above-mentioned form of the pigment particles is preferably used for the present invention.

In the inorganic pigments usable for the present invention, usually, the major axis of the particles is preferably in the range of from 0.5 μm to 50.0 μm. When the major axis is 0.5 μm or more, the resultant undercoat layer usually exhibit an excellent mechanical strength. When the major axis is less than 50.0 μm, usually, the resultant undercoat layer exhibits a high smoothness and the resultant ink jet recording sheet has a good appearance.

Further, if the pigment contained in the undercoat layer has too high an oil absorption, the resultant undercoat layer may exhibit a water repellency of less than R6, and a reduced water resistance and thus water may be able to penetrate into the undercoat layer through the ink receiving layer surface. Accordingly, the resultant ink jet recording sheet may exhibit an unsatisfactory water resistance. Therefore, the oil absorption of the pigment for the undercoat layer is preferably 250 ml/100 g or less.

When the oil absorption of the inorganic pigment contained in the undercoat layer is more than 100 ml/100 g, fine spherical particles having a diameter of about 100 μm are generated on the surface of the ink receiving layer coated on the undercoat layer, in a distribution density of, for example, about 10 particles/$cm^2$. These spherical particles do not cause any practical problem. However, sometimes, the spherical particles on the image-recorded surface of the printed ink jet recording sheet, glitter in the light, and thus cause the appearance of the image-recorded ink jet recording sheet to degraded. The reasons of the generation of the spherical particles is not clear. However, it is assumed that when the oil absorption of the inorganic pigment particles contained in the undercoat layer is more than 100 ml/100 g, the inorganic pigment particles also have a high water absorption and thus the resultant undercoat layer is caused to contain the inorganic pigment particles having a high water absorption similar to that of the pigment particles contained in the ink receiving layer, and therefore when an ink receiving layer coating liquid having a low water-retaining property is coated on the undercoat layer, a portion of the ink receiving layer coating liquid is quickly absorbed in the undercoat layer so as to put out fine air bubbles retained in the fine pores in the undercoat layer, and to cause the put out air bubbles to float up on the surface of the coating liquid layer and to form fine spherical particles. Accordingly, preferably, the pigment particles for the undercoat layer have an oil absorption of 100 ml/100 g or less, determined in accordance with JIS K 5101.

Particularly, the oil absorption of the pigment particles for the undercoat layer is more preferably 20 ml/100 g or more. It is assumed that when the oil absorption is 20 ml/100 g or more, a portion of the coating liquid for the ink receiving layer coated on the undercoat layer penetrates into the fine pores in the undercoat layer, and serve as anchors for the ink receiving layer, and thus the ink receiving layer can be firmly bonded to the undercoat layer and the resultant ink jet recording sheet exhibits an enhanced water resistance. The oil absorption of the pigment particles for the undercoat layer is more preferably 20 ml/100 g to 70 ml/100 g. When the oil absorption is less than 70 ml/100 g, the pigment particles do not have many pores and thus exhibit an excellent mechanical strength, and thus the resultant undercoat layer has a particularly excellent mechanical strength.

Preferably, the pigment particles are contained in a content of 90 parts by weight or less, more preferably 20 to 80 parts by weight, per 100 parts by total dry solid weight of the undercoat layer. If the content of the pigment particles is too high, the bonding strength of the resultant undercoat layer to the substrate and the ink receiving layer may fall and the resultant undercoat layer may exhibit an unsatisfactory water repellency.

When the content of the pigment is too low, the resultant undercoat layer may exhibit a sticking property. When a laminate comprising a substrate and an undercoat layer coated on the substrate is wound around a roll before the ink receiving layer is coated on the undercoat layer, the surface of the undercoat layer of the wound laminate may be adhered to the back surface of the substrate coming into contact with the undercoat layer surface, to generate a blocking phenomenon. When the ink receiving layer is successively coated on the undercoat layer without winding, the above mentioned blocking phenomenon does not occur. However, when the undercoat layer-coated laminate is wound, the undercoat layer preferably contains the pigment particles so as to prevent the blocking phenomenon.

Generally, the pigment particles to be contained in the undercoat layer preferably have a primary particle size of 0.2 to 20.0 μm. If the primary particle size of the pigment particles is too small, the resultant pigment has a high oil absorption and thus sometimes the above-mentioned spherical particles may be formed in the ink receiving layer. Also, if the particle size is too large, sometimes the pigment particles may be too large in comparison with the thickness of the undercoat layer, and portions of the pigment particles having a low oil absorption may project from the surface of the undercoat layer into the ink-receiving layer, so as to cause an unevenness of the recorded images and missing dots in the images when the ink images are recorded on the resultant ink jet recording sheet.

As mentioned above, the oil absorption of the pigment particles is variable depending on the particle form and particle size of the pigment particles. Therefore, the pigment particles having too high an oil absorption can be used for the undercoat layer when the pigment particles are physically or chemically treated so as to adjust the oil absorption thereof to a desired level. The pigments usable for the undercoat layer of the present invention may be employed alone or in a mixture of two or more thereof.

There is no limitation to the method of forming the undercoat layer on the substrate. However, usually, the undercoat layer can be formed by using a coating machine or a printing machine, for example, bar coater, air knife coater, blade coater and curtain coater. The amount of the undercoat layer in the ink jet recording sheet of the present invention is established in consideration of the final use of the ink jet recording sheet. The amount of the undercoat layer should be adjusted so that the resultant ink jet recording sheet can exhibit satisfactory water resistance, ink image-recording performance, and storage property. Usually, the amount of the undercoat layer is preferably 0.2 to 15.0 g/m$^2$ and more preferably 0.5 to 8.0 g/m$^2$.

If the amount of the undercoat layer is too small, the bonding strength of the resultant undercoat layer to the substrate may be slightly unsatisfactory, and sometimes, when the undercoat layer contains water and the surface of the ink receiving layer formed on the undercoat layer is strongly rubbed with an article having a small contact area with the ink receiving layer, for example, an end point of a pen under a high pressure, the ink receiving layer may be separated together with the undercoat layer from the interface between the substrate and the undercoat layer, whereas when the ink receiving layer surface is rubbed with a finger, no problem occurs.

Also, if the amount of the undercoat layer is very small, the bonding strength of the undercoat layer to the substrate may be insufficient and thus the resultant ink jet recording sheet may be unsatisfactory in water resistance, and when the undercoat layer contains water and the surface of the ink receiving layer is rubbed with a finger, the ink receiving layer may be separated from the undercoat layer from the interface between the undercoat layer and the substrate.

Also, if the amount of the undercoat layer is too large, the above-mentioned fine spherical particles may be generated in a small number on the surface of the ink receiving layer coated on the undercoat layer and may cause the appearance of the ink jet recording sheet to be degraded, while the fine spherical particles do not cause any problem in practical use.

The pigments usable for the ink receiving layer are not limited to specific types of pigments. The pigments for the ink receiving layer may be selected from conventional inorganic pigments, for example, zeolite, calcium carbonate, calcium silicate, aluminum hydroxide, calcined clay, kaolin clay, talc, white carbon, and convention organic pigments (plastic pigments), usable for coating paper sheets.

However, the pigments for the ink receiving layer are preferably selected from those comprising, as a principal component, fine amorphous silica particles which are porous, have a high ink absorption, enable the ink to form clear images, exhibit a high oil absorption and a high specific surface area and have a secondary particle size of 1 to 10 $\mu$m. The fine amorphous silica particles are preferably contained in content of 50 to 90% by weight based on the total weight of the ink receiving layer. If the content of the fine amorphous silica particles is too small, the ink absorption of the resultant ink receiving layer may be unsatisfactory. Also, if the fine amorphous silica particle content is too large, the resultant ink receiving layer may exhibit an insufficient mechanical strength.

In response to the purpose of use of the ink jet receiving sheet and the performances required from the printer, the ink receiving layer may contain, in addition to the fine amorphous silica pigment, other white pigments.

The polymeric binder for the ink receiving layer comprises preferably at least one selected from polyvinyl alcohols and derivatives thereof, proteins, for example, casein; starch and starch derivatives, latices of conjugated diene polymers, for example, styrene-butadiene copolymers, and methyl methacrylate-butadiene copolymers; latices of acrylic polymers, for example, polymers and copolymers and acrylic acid esters and methacrylic acid esters; latices of vinyl polymers, for example, ethylene-vinyl acetate copolymers; latices of functional group-containing modified polymers which are modification reaction products of the above-mentioned polymers with a modifying agent having functional groups, for example, carboxyl and cationic groups; water-soluble binders comprising thermosetting synthetic resins, for example, melamine resins and urea resins; and synthetic resin binders, for example, maleic anhydride copolymer resins, polyacrylamide resins, polymethyl-methacrylate resins, polyurethane resins, unsaturated polyester resins, polyvinylbutyral resins and alkid resins, which have a high affinity to the ink and can cause the resultant ink receiving layer to exhibit an enhanced liquid-absorption.

There is no specific limitation to the content of the polymeric binder in the ink receiving layer. Usually, the content of the polymeric binder is preferably 10 to 50% by weight, more preferably 10 to 40% by weight, based on the total dry solid weight of the ink receiving layer. If the content is too small, the resultant ink receiving layer may have an insufficient bonding strength to the undercoat layer and an unsatisfactory mechanical strength. Also, if the content is too large, the content of the pigment may be insufficient and thus the resultant ink receiving layer may exhibit an unsatisfactory ink absorption.

The procedures for forming the ink receiving layer on the undercoat layer formed on the substrate are not specifically limited. Usually, the ink receiving layer can be formed by a conventional coating machine or printing machine, for example, bar coater, air knife coater, blade coater or curtain coater.

The sheet produced by forming an ink receiving layer on an undercoat layer formed on a substrate can be used as a recording sheet, without applying any additional procedure thereto. However, the sheet may be surface smoothed by using, for example, a super calendar or a gloss calender.

The amount of the ink receiving layer for the ink jet recording sheet of the present invention can be established in consideration of the final use of the recording sheet. The amount of the ink receiving layer can be adjusted to an appropriate level so that the resultant ink receiving layer exhibits satisfactory ink absorption, recording performance, storage and opaqueness, preferably to 3 to 20 g/m$^2$. If the amount of the ink receiving layer is too small, the resultant layer may exhibit an unsatisfactory ink absorption capacity, the ink images may spread, colors of the images may be mixed with each other and thus the printed ink images may become unclear. Also, it may happen that since the ink images are dried at a low rate, the ink images may cohere with the rollers in the printer so as to soil the rollers. However, if the amount of the ink receiving layer is too large, the resultant layer may have too large a thickness, may exhibits an unsatisfactory bonding strength to the substrate through the undercoat layer, and may cause the ink jet nozzles to be blocked, and the cost of the resultant ink jet recording sheet may be too high.

EXAMPLES

The present invention will be further explained by the following examples which do not limit the scope of the present invention in any way.

Example 1

(1) Preparation of an Undercoat Layer-Coated Sheet

A coating liquid for undercoat layer was prepared by mixing 60 parts by weight of a calcium carbonate pigment having an oil absorption 60 ml/100 g (trademark: Calrite SA, made by Shiraishi Chuokenkyusho) with 40 parts by dry solid weight an aqueous emulsion of an acrylic resin having a glass transition temperature of 0° C. (trademark: AE-322, made by Nihon Goseigomu K.K.), and diluting the mixture with water to adjust the concentration of the dry solid content in the diluted mixture to 50% by dry solid weight.

As a substrate sheet, a multilayered synthetic paper sheet having a thickness of 80 μm, available under the trademark of Yupo FPG-80, from Oji Yukagoseishi K.K., and comprising a plurality of biaxially oriented films comprising an inorganic pigment and a polyolefin resin, was used.

The above-mentioned coating liquid was coated at a dry weight of 3.0 g/$m^2$ on a surface of the substrate sheet by using a bar coater and dried at a temperature of 110° C. to form a white undercoat layer.

(2) Production of an Ink Jet Recording Sheet

A coating liquid for ink receiving layer was prepared by mixing a polyvinyl alcohol (trademark: PVA 117, made by Kuraray) in a dry weight of 20 parts with 400 parts by weight of water, heating the mixture to a temperature of 90° C. while stirring the mixture, to dissolve the polyvinyl alcohol in water, and further mixing the resultant solution with 80 parts by dry weight of fine amorphous silica particles having an average particle size of 2.5 μm and an oil absorption of 280 ml/100 g (trademark: Finesil X-40, made by Tokuyama), while stirring the mixture.

The resultant coating liquid was coated on the surface of the undercoat layer of the above-mentioned undercoat layer-coated sheet by using a bar coater, and drying the coating liquid layer at a temperature of 110° C. to form an ink receiving layer having a dry solid weight of 10.0 g/$m^2$. A white ink jet recording sheet was obtained.

Example 2

An ink jet recording sheet was produced by the same procedures as in Example 1 with the following exceptions.

In the formation of the undercoat layer on the substrate sheet, as a polymeric binder, an aqueous emulsion of an acrylic resin having a glass transition temperature of −30° C. (trademark: AE-337, made by Nihon Goseigomu K.K.) in an amount of 40 parts by dry solid weight was used in place of the aqueous acrylic resin emulsion (trademark: AE-322, made by Nihon Goseigomu K.K., glass transition temperature: 0° C.) in an amount of 40 parts by dry solid weight.

Example 3

An ink jet recording sheet was produced by the same procedures as in Example 1 with the following exceptions.

In the formation of the undercoat layer on the substrate sheet, as a polymeric binder, an aqueous emulsion of an acrylic resin having a glass transition temperature of 50° C. (trademark: AE-116, made by Nihon Goseigomu K.K.) in an amount of 40 parts by dry solid weight was used in place of the aqueous acrylic resin emulsion (trademark: AE-322, made by Nihon Goseigomu K.K., glass transition temperature: 0° C.) in an amount of 40 parts by dry solid weight.

Comparative Example 1

An ink jet recording sheet was produced by the same procedures as in Example 1 with the following exceptions.

The undercoat layer was not formed and the ink receiving layer was directly coated on the surface of the substrate sheet.

Comparative Example 2

An ink jet recording sheet was produced by the same procedures as in Example 1 with the following exceptions.

In the formation of the undercoat layer on the substrate sheet, as a polymeric binder, an aqueous emulsion of an acrylic resin having a glass transition temperature of 58° C. (trademark: AE-121, made by Nihon Goseigomu K.K.) in an amount of 40 parts by dry solid weight was used in place of the aqueous acrylic resin emulsion (trademark: AE-322, made by Nihon Goseigomu K.K., glass transition temperature: 0° C.) in an amount of 40 parts by dry solid weight.

Example 4

An ink jet recording sheet was produced by the same procedures as in Example 1 with the following exceptions.

In the formation of the undercoat layer on the substrate sheet, as a pigment, magnesium silicate having an oil absorption of 83 ml/100 g (trademark: Silfonite M-12, made by Mizusawa Kagakukogyo K.K.) in an amount of 60 parts by dry solid weight was used in place of the calcium carbonate having an oil absorption of 60 ml/100 g (trademark: Calrite SA, made by Shiraishi Chuokenkyusho) in an amount of 60 parts by dry solid weight.

Example 5

An ink jet recording sheet was produced by the same procedures as in Example 1 with the following exceptions.

In the formation of the undercoat layer on the substrate sheet, as a pigment, fine amorphous silica pigment having an oil absorption of 115 ml/100 g, an average particle size of 2.2 μm and an specific surface area of 30 $m^2$/g (trademark: Mizukasil P-603, made by Mizusawa Kagakukogyo K.K.) in an amount of 60 parts by dry solid weight was used in place of the calcium carbonate having an oil absorption of 60 ml/100 g (trademark: Calrite SA, made by Shiraishi Chuokenkyusho) in an amount of 60 parts by dry solid weight.

Example 6

An ink jet recording sheet was produced by the same procedures as in Example 1 with the following exceptions.

In the formation of the undercoat layer on the substrate sheet, the undercoat layer was formed in a dry solid weight of 0.2 g/$m^2$ in place of 3.0 g/$m^2$.

Example 7

An ink jet recording sheet was produced by the same procedures as in Example 1 with the following exceptions.

In the formation of the undercoat layer on the substrate sheet, the undercoat layer was formed in a dry solid weight of 0.4 $g/m^2$ in place of 3.0 $g/m^2$.

Example 8

An ink jet recording sheet was produced by the same procedures as in Example 1 with the following exceptions.

In the formation of the undercoat layer on the substrate sheet, the undercoat layer was formed in a dry solid weight of 0.5 $g/m^2$ in place of 3.0 $g/m^2$.

Example 9

An ink jet recording sheet was produced by the same procedures as in Example 1 with the following exceptions.

In the formation of the undercoat layer on the substrate sheet, the undercoat layer was formed in a dry solid weight of 8.0 $g/m^2$ in place of 3.0 $g/m^2$.

Example 10

An ink jet recording sheet was produced by the same procedures as in Example 1 with the following exceptions.

In the formation of the undercoat layer on the substrate sheet, the undercoat layer was formed in a dry solid weight of 9.0 $g/m^2$ in place of 3.0 $g/m^2$.

Example 11

An ink jet recording sheet was produced by the same procedures as in Example 1 with the following exceptions.

In the formation of the undercoat layer on the substrate sheet, the undercoat layer was formed in a dry solid weight of 15.0 $g/m^2$ in place of 3.0 $g/m^2$.

Example 12

An ink jet recording sheet was produced by the same procedures as in Example 1 with the following exceptions.

In the formation of the undercoat layer on the substrate sheet, as a polymeric binder, a latex of a carboxyl-modified styrene-butadiene copolymer having a glass transition temperature of 50° C. (trademark: 0640, made by Nihon Goseigomu K.K.) in an amount of 40 parts by dry solid weight was used in place of the aqueous acrylic resin emulsion (trademark: AE-322, made by Nihon Goseigomu K.K., glass transition temperature: 0° C.) in an amount of 40 parts by dry solid weight.

Example 13

An ink jet recording sheet was produced by the same procedures as in Example 1 with the following exceptions.

In the formation of the undercoat layer on the substrate sheet, the aqueous acrylic resin emulsion (trademark: AE-322, made by Nihon Goseigomu K.K., glass transition temperature: 0° C.) was employed in an amount of 10 parts by dry solid weight, in place of 40 parts by dry solid weight.

Example 14

An ink jet recording sheet was produced by the same procedures as in Example 1 with the following exceptions.

In the formation of the undercoat layer on the substrate sheet, the aqueous emulsion of an acrylic resin having a glass transition temperature of 0° C. (trademark: AE-322, made by Nihon Goseigomu K.K.) was employed in an amount of 18 parts by dry solid weight in place of 40 parts by dry solid weight.

Example 15

An ink jet recording sheet was produced by the same procedures as in Example 1 with the following exceptions.

In the formation of the undercoat layer on the substrate sheet, the aqueous emulsion of an acrylic resin having a glass transition temperature of 0° C. (trademark: AE-322, made by Nihon Goseigomu K.K.) was employed in an amount of 20 parts by dry solid weight in place of 40 parts by dry solid weight.

Example 16

An ink jet recording sheet was produced by the same procedures as in Example 1 with the following exceptions.

In the formation of the undercoat layer on the substrate sheet, the aqueous emulsion of an acrylic resin having a glass transition temperature of 0° C. (trademark: AE-222, made by Nihon Goseigomu K.K.) was employed in an amount of 80 parts by dry solid weight in place of 40 parts by dry solid weight.

Example 17

An ink jet recording sheet was produced by the same procedures as in Example 1 with the following exceptions.

In the formation of the undercoat layer on the substrate sheet, the aqueous emulsion of an acrylic resin having a glass transition temperature of 0° C. (trademark: AE-322, made by Nihon Goseigomu K.K.) was employed in an amount of 85 parts by dry solid weight in place of 40 parts by dry solid weight.

Example 18

An ink jet recording sheet was produced by the same procedures as in Example 1 with the following exceptions.

In the formation of the undercoat layer on the substrate sheet, the aqueous emulsion of an acrylic resin having a glass transition temperature of 0° C. (trademark: AE-322, made by Nihon Goseigomu K.K.) was employed in an amount of 100 parts by dry solid weight in place of 40 parts by dry solid weight.

Example 19

An ink jet recording sheet was produced by the same procedures as in Example 1 with the following exceptions.

In the formation of the undercoat layer on the substrate sheet, the coating liquid for the undercoat layer was prepared in the following compositions.

| Component | Parts by dry solid weight |
|---|---|
| Calcium carbonate pigment having an oil absorption of 60 ml/100 g | 60 |

-continued

| Component | Parts by dry solid weight |
|---|---|
| (trademark: Calrite SA, made by Shiraishi Chuokenkyusho) | |
| Aqueous emulsion of acrylic resin having a glass transition temperature of −45° C. (trademark: AE-220, made by Nihon Goseigomu K.K.) | 40 |
| Aqueous polyisocyanate cross-linking agent (trademark: Elastron BN-69, made by Daiichi Kogyoseiyaku K.K.) | 0.1 |

Example 20

An ink jet recording sheet was produced by the same procedures as in Example 1 with the following exceptions.

In the formation of the undercoat layer on the substrate sheet, the coating liquid for the undercoat layer was prepared in the following compositions.

| Component | Parts by dry solid weight |
|---|---|
| Calcium carbonate pigment having an oil absorption of 60 ml/100 g (trademark: Calrite SA, made by Shiraishi Chuokenkyusho) | 60 |
| Aqueous emulsion of acrylic resin having a glass transition temperature of −45° C. (trademark: AE-220, made by Nihon Goseigomu K.K.) | 40 |
| Aqueous polyisocyanate cross-linking agent (trademark: Elastron BN-69, made by Daiichi Kogyoseiyaku K.K.) | 0.2 |

Example 21

An ink jet recording sheet was produced by the same procedures as in Example 1 with the following exceptions.

In the preparation of the undercoat layer on the substrate sheet, the coating liquid for the undercoat layer was prepared in the following compositions.

| Component | Parts by dry solid weight |
|---|---|
| Calcium carbonate pigment having an oil absorption of 60 ml/100 g (trademark: Calrite SA, made by Shiraishi Chuokenkyusho) | 60 |
| Aqueous emulsion of acrylic resin having a glass transition temperature of −45° C. (trademark: AE-220, made by Nihon Goseigomu K.K.) | 40 |
| Aqueous polyisocyanate cross-linking agent (trademark: Elastron BN-69, made by Daiichi Kogyoseiyaku K.K.) | 1.0 |

Example 22

An ink jet recording sheet was produced by the same procedures as in Example 1 with the following exceptions.

In the preparation of the undercoat layer on the substrate sheet, the coating liquid for the undercoat layer was prepared in the following compositions.

| Component | Parts by dry solid weight |
|---|---|
| Calcium carbonate pigment having an oil absorption of 60 ml/100 g (trademark: Calrite SA, made by Shiraishi Chuokenkyusho) | 60 |
| Aqueous emulsion of acrylic resin having a glass transition temperature of −45° C. (trademark: AE-220, made by Nihon Goseigomu K.K.) | 40 |
| Aqueous polyisocyanate cross-linking agent (trademark: Elastron BN-69, made by Daiichi Kogyoseiyaku K.K.) | 5.0 |

Example 23

An ink jet recording sheet was produced by the same procedures as in Example 1 with the following exceptions.

In the preparation of the undercoat layer on the substrate sheet, as a pigment, 60 parts by dry solid weight of fine amorphous silica particles having an oil absorption of 230 ml/100 g (trademark: Mizukasil 802 Y, made by Mizusawa Kagakukogyo K.K.) were used in place of the calcium carbonate pigment having an oil absorption of 60 ml/100 g (trademark: Calrite SA, made by Shiraishi Chuokenkyusho) in an amount of 60 parts by dry solid weight.

Example 24

An ink jet recording sheet was produced by the same procedures as in Example 1 with the following exceptions.

In the formation of the undercoat layer on the substrate sheet, as a pigment, 60 parts by dry solid weight of fine amorphous silica particles having an oil absorption of 260 ml/100 g (trademark: Mizukasil P-709, made by Mizusawa Kagakukogyo K.K.) were used in place of the calcium carbonate pigment having an oil absorption of 60 ml/100 g (trademark: Calrite SA, made by Shiraishi Chuokenkyusho) in an amount of 60 parts by dry solid weight.

Example 25

An ink jet recording sheet was produced by the same procedures as in Example 1 with the following exceptions.

In the formation of the undercoat layer on the substrate sheet, the coating liquid for the undercoat layer was prepared in the following compositions.

| Component | Parts by dry solid weight |
|---|---|
| Calcium carbonate pigment having an oil absorption of 60 ml/100 g (trademark: Calrite SA, made by Shiraishi Chuokenkyusho) | 60 |
| Polyvinyl alcohol having a glass transition temperature of 45° C. | 40 |
| Aqueous polyisocyanate cross-linking agent (trademark: Elastron BN-69, made by Daiichi Kogyoseiyaku K.K.) | 1.0 |

In each of Examples 1 to 25 and Comparative Examples 1 and 2, the resultant ink jet recording sheet was subjected to the following test.

(1) Color Density of Images

The ink jet recording sheet was printed in yellow, magenta and cyan colors by using an ink jet printer (trademark: Desk Writer-C, made by HP Co.). The printed colored images were observed by naked eye and evaluated as follows.

| Class | Color density |
|---|---|
| 3 | Good |
| 2 | Slightly unsatisfactory |
| 1 | Bad |

(2) Appearance of Recording Sheet Before Printing

Before subjecting to printing, the appearance of the recording sheet was observed by naked eye and evaluated as follows.

| Class | Appearance |
|---|---|
| 4 | Good |
| 3 | Few fine spherical particles are found on the surface when carefully observed. |
| 2 | Usable for practice, while there are fine spherical particles on the surface. |
| 1 | Bad |

(3) Water Resistance

On the surface of the ink receiving layer of the recording sheet, a water drop in a volume of 1 ml was placed for 10 seconds, then the water drop-placed portion of the ink receiving layer surface was rubbed with a finger, to observe whether the rubbed portion is peeled off from the substrate, and evaluated as follows.

| Class | Water resistance |
|---|---|
| 5 | No peeling occurs. Excellent in water resistance |
| 4 | Very slight peeling occurs. Good in water resistance |
| 3 | Slight peeling occurs. Usable in practice |
| 2 | Peeling occurs. Unsatisfactory water resistance |
| 1 | Peeling easily occurs. Very poor water resistance |

(4) Blocking Resistance

In each of the examples and comparative examples, the laminate sheet consisting of the undercoat layer coated on the substrate sheet was subjected to a blocking test in the following manner.

A multilayered synthetic paper sheet containing an inorganic pigment and having a thickness of 80 μm (trademark: Yupo FPG-80, thickness: 80 μm, made by Oji Yukagoseishi K.K.) was superposed on the undercoat layer surface of the laminate sheet, and a load of 1 kg was applied to the synthetic paper sheet surface for 24 hours. Then it was observed by naked eye whether the synthetic paper sheet cohered to the undercoat layer surface, and the observation result was evaluated as follows.

| Class | Blocking resistance |
|---|---|
| 4 | No blocking occurs. |
| 3 | Very slight blocking occurs. Practically usable |
| 2 | Slight blocking occurs. Practically usable |
| 1 | Bad |

(5) Water Repellency

The water repellency of the undercoat layer surface was measured in accordance with Japanese Industrial Standard (JIS) P 8137, as follows.

The water repellency is represented by the conditions of a water drop placed on a surface of a sheet to be tested, inclined from the horizontal plane. A surface of a stand for fixing the sheet to be tested inclined at an angle of 45 degrees from the horizontal plane, had a length of 350 mm and a width of 200 mm and was flat and smooth so that the sheet could be fixed flat thereon. A burette capable of dropping down a water drop having a volume of about 0.1 ml was used. The sheets to be tested had a length of 300 mm or more and a width of 200 mm. Five of the sheets were used for each of the length and width directions.

A sheet is fixed on the inclined surface of the stand, the burette containing water at a temperature of 20° C. was arranged in the manner that the end of the burette was spaced 10 mm from the surface of the sheet in the vertical direction with respect to the horizontal plane, and a water drop was dropped from the burette to flow downward in a distance of about 300 mm on the inclined sheet surface. The water drop was dropped onto the inclined sheet surface, and the water flow conditions were observed by naked eye and evaluated as follows.

| Water repellency | Water flow conditions |
|---|---|
| R0 | The water flow locus is continuous and has a constant width. |
| R2 | The water flow locus is continuous, and has a width slightly narrower than the diameter of the water drop. |
| R4 | The water flow locus is slightly intermittent and has a width clearly narrower than the diameter of the water drop. |
| R6 | A half of the water flow locus is wetted. |
| R7 | About 1/4 of the water flow locus is wetted with an elongated water drop. |
| R8 | In 1/4 or more of the water flow locus, fine spherical water droplets spaced from each other are located. |
| R9 | Spherical water droplets are locally located on the sheet surface. |
| R10 | The water drop completely slips down on the sheet surface. |

The test results of Examples 1 to 11 and Comparative Examples 1 and 2 are shown in Table 1. The test results of Examples 12 to 25 are shown in Table 2.

TABLE 1

| Example No. | | Undercoat layer: Glass transition temperature of polymeric binder (° C.) | Undercoat layer: Oil absorption of pigment (ml/100 g) | Undercoat layer: Content of polymeric binder (parts by dry solid weight) | Undercoat layer: Coating weight (g/m²) | Ink jet recording sheet: Color density of images | Ink jet recording sheet: Appearance before recording | Ink jet recording sheet: Water-resistance | Ink jet recording sheet: Blocking resistance | Ink jet recording sheet: Water repellency |
|---|---|---|---|---|---|---|---|---|---|---|
| Example | 1 | 0 | 60 | 40 | 3 | 3 | 4 | 5 | 4 | R7 |
| | 2 | −30 | 60 | 40 | 3 | 3 | 4 | 5 | 4 | R7 |
| | 3 | 50 | 60 | 40 | 3 | 3 | 4 | 5 | 4 | R7 |
| Comparative | 1 | — | — | — | — | 3 | 4 | 1 | 4 | — |
| Example | 2 | 58 | 60 | 40 | 3 | 3 | 4 | 2 | 4 | R7 |
| Example | 4 | 0 | 83 | 40 | 3 | 3 | 4 | 5 | 4 | R6 |
| | 5 | 0 | 115 | 40 | 3 | 3 | 2 | 5 | 4 | R6 |
| | 6 | 0 | 60 | 40 | 0.2 | 3 | 4 | 4 | 4 | R7 |
| | 7 | 0 | 60 | 40 | 0.4 | 3 | 4 | 4 | 4 | R7 |
| | 8 | 0 | 60 | 40 | 0.5 | 3 | 4 | 5 | 4 | R7 |
| | 9 | 0 | 60 | 40 | 8 | 3 | 4 | 5 | 4 | R7 |
| | 10 | 0 | 60 | 40 | 9 | 3 | 3 | 5 | 4 | R7 |
| | 11 | 0 | 60 | 40 | 15 | 3 | 3 | 5 | 4 | R7 |

TABLE 2

| Example No. | | Undercoat layer: Glass transition temperature of polymeric binder (° C.) | Undercoat layer: Oil absorption of pigment (ml/100 g) | Undercoat layer: Content of polymeric binder (parts by dry solid weight) | Undercoat layer: Coating weight (g/m²) | Ink jet recording sheet: Color density of images | Ink jet recording sheet: Appearance before recording | Ink jet recording sheet: Water-resistance | Ink jet recording sheet: Blocking resistance | Ink jet recording sheet: Water repellency |
|---|---|---|---|---|---|---|---|---|---|---|
| Example | 12 | 50 | 60 | 40 | 3 | 3 | 4 | 4 | 4 | R7 |
| | 13 | 0 | 60 | 10 | 3 | 3 | 4 | 4 | 4 | R6 |
| | 14 | 0 | 60 | 18 | 3 | 3 | 4 | 4 | 4 | R6 |
| | 15 | 0 | 60 | 20 | 3 | 3 | 4 | 5 | 4 | R6 |
| | 16 | 0 | 60 | 80 | 3 | 3 | 4 | 5 | 4 | R8 |
| | 17 | 0 | 60 | 85 | 3 | 3 | 4 | 5 | 3 | R8 |
| | 18 | 0 | 60 | 100 | 3 | 3 | 4 | 5 | 3 | R9 |
| | 19 | −45 | 60 | 40 | 3 | 3 | 4 | 5 | 2 | R7 |
| | 20 | −45 | 60 | 40 | 3 | 3 | 4 | 5 | 3 | R7 |
| | 21 | −45 | 60 | 40 | 3 | 3 | 4 | 5 | 4 | R7 |
| | 22 | −45 | 60 | 40 | 3 | 3 | 4 | 5 | 4 | R7 |
| | 23 | 0 | 230 | 40 | 3 | 3 | 2 | 5 | 4 | R6 |
| | 24 | 0 | 260 | 40 | 3 | 3 | 2 | 4 | 4 | R6 |
| | 25 | 45 | 60 | 40 | 3 | 3 | 4 | 3 | 4 | R4 |

Tables 1 and 2 show that the ink jet recording sheets of Examples 1 to 25 in accordance with the present invention can record thereon clear colored images have a satisfactory appearance before recording and a high water resistance and a high blocking resistance of the undercoat layers, whereas the ink jet recording sheets of Comparative Example 1 in which no undercoat layer was formed and Comparative Example 2 in which the polymeric binder for the undercoat layer had a glass transition temperature higher than 50° C., exhibited an unsatisfactory water resistance.

Example II-1

(1) Preparation of an Undercoat Layer-Coated Sheet

A coating liquid for undercoat layer was prepared by mixing 60 parts by weight of calcium carbonate pigment particles having an average aspect ratio of 3.0, a major axis of 1.5 μm, a minor axis of 0.5 μm, a particle form of a spindle, and an oil absorption 47 ml/100 g (trademark: TP-121, made by Okutama Kogyo K.K.) with 40 parts by dry solid weight an aqueous emulsion of an acrylic resin having a glass transition temperature of 0° C. (trademark: AE-322, made by Nihon Goseigomu K.K.), and diluting the mixture with water, while agitating, to adjust the concentration of the dry solid content in the diluted mixture to 50% by dry solid weight.

As a substrate sheet, a multilayered synthetic paper sheet having a thickness of 80 μm, available under the trademark of Yupo FPG-80, from Oji Yukagoseishi K.K., and comprising a plurality of biaxially oriented films comprising an inorganic pigment and a polyolefin resin, was used.

The above-mentioned coating liquid was coated in a dry weight of 3.0 g/m$^2$ on a surface of the substrate sheet by using a bar coater and dried at a temperature of 110° C. to form a white undercoat layer.

(2) Production of an Ink Jet Recording Sheet

A coating liquid for ink receiving layer was prepared by mixing a polyvinyl alcohol (trademark: PVA 117, made by Kuraray) in a dry weight of 20 parts with 400 parts by weight of water, heating the mixture to a temperature of 90° C. while stirring the mixture, to dissolve the polyvinyl alcohol in water, and further mixing the resultant solution with 80 parts by dry weight of fine amorphous silica particles (trademark: Finesil X-60, made by Tokuyama), while stirring the mixture.

The resultant coating liquid was coated on the surface of the undercoat layer of the above-mentioned undercoat layer-coated sheet by using a bar coater, and drying the coating liquid layer at a temperature of 110° C. to form an ink receiving layer having a dry solid weight of 10.0 g/m$^2$. A white ink jet recording sheet was obtained.

Example II-2

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of calcium carbonate pigment particles in the form of a rod and having an average aspect ratio of 8.0, a major axis of 1.5 μm, a minor axis of 0.2 μm, and an oil absorption of 63 ml/100 g (trademark: TP-123, made by Okutama Kogyo K.K.).

Example II-3

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of kaolin pigment particles in the form of a plate and having an average aspect ratio of 18.0.

Comparative Example II-1

An ink jet recording sheet was produced by the same procedures as in Example II-1, except that no undercoat layer was formed.

Example II-4

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of calcium carbonate pigment particles in the form of a spindle and having an average aspect ratio of 1.7, a major axis of 0.5 μm, a minor axis of 0.3 μm, and an oil absorption of 38 ml/100 g (trademark: TP-222H, made by Okutama Kogyo K.K.).

Example II-5

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of kaolin pigment particles in the form of a plate and having an average aspect ratio of 35.0.

Example II-6

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of calcium carbonate pigment particles in the form of a needle and having an average aspect ratio of 75.0, a major axis of 1.5 μm, a minor axis of 0.02 μm, and an oil absorption of 90 ml/100 g.

Example II-7

An ink jet recording sheet was produced by the same procedures as in Example II-1, with the following exceptions.

In the preparation of the coating liquid for the undercoat layer, 60 parts by dry solid weight of the calcium carbonate pigment particles in the form of a spindle and having an average aspect ratio of 3.0 (trademark: TP-121, made by Okutama Kogyo K.K.) were replaced by 60 parts by dry solid weight of calcium carbonate pigment particles in the form of a needle and having an average aspect ratio of 120.0, a major axis of 1.5 μm, a minor axis of 0.012 μm, and an oil absorption of 90 ml/100 g.

In each of Examples II-1 to II-7 and Comparative Example II-1, the resultant ink jet recording sheet was subjected to the following test.

(1) Color Density of Images

The ink jet recording sheet was printed in yellow, magenta and cyan colors by using an ink jet printer (trademark: Desk Writer-C, made by HP Co.). The printed colored images were observed by naked eye and evaluated as follows.

| Class | Color density |
|---|---|
| 3 | Good |
| 2 | Slightly unsatisfactory |
| 1 | Bad |

(2) Surface Strength

A transparent adhesive tape (trademark: Cellophane tape, made by Nichiban) was adhered to an ink receiving layer surface of the recording sheet and peeled off. The resultant surface conditions of the recording sheet was observed by naked eye and evaluated as follows.

| Class | Surface conditions |
|---|---|
| 5 | Excellent (No change occurs on surface) |
| 4 | Good |
| 3 | No problem in practice |
| 2 | Unsatisfactory in practice |
| 1 | Bad (Coated layer is significantly exfoliated) |

(3) Water Resistance (I)

Water in a volume of 1 ml was placed dropwise on an ink-receiving surface of the recording sheet and, 10 seconds after, the water-wetted surface was rubbed with a finger. The resistance of the coating in the rubbed portion to separation from the substrate was evaluated by naked eye as follows.

| Class | Separation resistance |
|---|---|
| 4 | Good |
| 3 | Satisfactory to practice |
| 2 | Unsatisfactory to practice |
| 1 | Bad |

(4) Water Resistance (II)

The recording sheet was immersed in water at room temperature for 10 minutes, and taken out from water. Then 10 seconds after the taking out, the ink receiving surface of the recording sheet was rubbed with a finger. The resistance of the coating in the rubbed portion to separation from the substrate was evaluated by naked eye as follows.

| Class | Separation resistance |
|---|---|
| 4 | Excellent |
| 3 | Good |
| 2 | Usable in practice |
| 1 | Bad |

(5) Blocking Resistance

In each of the examples and comparative examples, the laminate sheet consisting of the undercoat layer coated on the substrate sheet was subjected to a blocking test in the following manner.

A multilayered synthetic paper sheet containing an inorganic pigment and having a thickness of 80 μm (trademark: Yupo FPG-80, made by Oji Yukagoseishi K.K.) was superposed on the undercoat layer surface of the laminate sheet, and a load of 1 kg was applied to the synthetic paper sheet surface for 24 hours. Then it was observed by naked eye whether the synthetic paper sheet cohered to the undercoat layer surface, and the observation result was evaluated as follows.

| Class | Blocking resistance |
|---|---|
| 4 | No blocking occurs. (Excellent) |
| 3 | Very slight blocking occurs. Practically usable (Good) |
| 2 | Slight blocking occurs. Practically usable |
| 1 | Bad |

(6) Aspect Ratio (JIS R 1600)

The pigment particles were observed by an electron microscope at a magnification of 1000 and the major and minor axes of the particles were measured. The aspect ratio of each particle was calculated in accordance with the following equation.

Aspect ratio=(Major axis)/(Minor axis)

The test results are shown in Table 3.

TABLE 3

| Example No. | | Item | | | | | | | |
|---|---|---|---|---|---|---|---|---|---|
| | | Undercoat layer | | | Ink jet recording sheet | | | | |
| | | Presence of undercoat layer | Aspect ratio of pigment particles | Content of pigment (parts by dry solid weight) | Color density of images | Water resistance (I) | Water resistance (II) | Blocking resistance of undercoat layer | Surface strength |
| Example | II-1 | Yes | 3.0 | 60 | 3 | 4 | 4 | 4 | 5 |
| | II-2 | " | 7.5 | 60 | 3 | 4 | 4 | 4 | 4 |
| | II-3 | " | 18.0 | 60 | 3 | 4 | 4 | 4 | 4 |
| Comparative Example | II-1 | No | — | — | 3 | 1 | 1 | 4 | 4 |
| Example | II-4 | Yes | 1.7 | 60 | 3 | 4 | 3 | 4 | 5 |
| | II-5 | " | 35.0 | 60 | 3 | 4 | 4 | 4 | 4 |

TABLE 3-continued

| Example No. | Item | | | | | | | |
|---|---|---|---|---|---|---|---|---|
| | Undercoat layer | | | Ink jet recording sheet | | | | |
| | Presence of undercoat layer | Aspect ratio of pigment particles | Content of pigment (parts by dry solid weight) | Color density of images | Water resistance (I) | Water resistance (II) | Blocking resistance of undercoat layer | Surface strength |
| II-6 | " | 75.0 | 60 | 3 | 4 | 4 | 4 | 4 |
| II-7 | " | 125.0 | 60 | 3 | 4 | 4 | 4 | 3 |

Table 3 shows that the ink jet recording sheets of Examples II-1 to II-7 in accordance with the present invention can record thereon clear colored ink images and have satisfactory surface strength and water resistance and a high blocking resistance of the undercoat layer, and thus can be easily produced.

What we claim is:

1. An ink jet recording sheet capable of being recorded with aqueous ink images comprising a substrate comprising a polymeric film;

an ink receiving layer comprising a pigment and a polymeric binder; and a water-repellent undercoat layer formed between the substrate and the ink receiving layer and bonding the substrate and ink receiving layers to each other, the undercoat layer comprising (1) a polymeric binder comprising at least one water-insoluble resin selected from the group consisting of conjugated diene polymers and copolymers, acrylic homopolymers and copolymers, vinyl polymers and copolymers; and modification reaction products of the above-mentioned polymers and copolymers, having modification functional groups, and (2) pigment particles of at least one member selected from the group consisting of calcium carbonate and magnesium silicate, and the water-insoluble resin for the polymeric binder (1) having a glass transition temperature of from −45° C. to 50° C., and the undercoat layer exhibiting a water repellency of R6 or more determined in accordance with Japanese Industrial Standard P 8137, and being present in an amount of 0.2 to 15.0 g/$m^2$, whereby the interfaces between the undercoat layer and the ink receiving layer and between the substrate and the undercoat layer respectively are resistive to water penetration therethrough and thus the ink receiving layer is firmly bonded to the substrate through the undercoat layer.

2. The ink jet recording sheet as claimed in claim 1, wherein the pigment for the ink receiving layer comprises fine amorphous silica particles.

3. The ink jet recording sheet as claimed in claim 1, wherein the pigment for the undercoat layer has an oil absorption of 250 ml/100 g or less, determined in accordance with Japanese Industrial Standard K 5101.

4. The ink jet recording sheet as claimed in claim 1, wherein the polymeric binder for the undercoat layer comprises a water-dispersible resin having a glass transition temperature of −45° C. 50° C.

5. The ink jet recording sheet as claimed in claim 1, wherein the polymeric binder in the undercoat layer is cross-linked with a cross-linking agent.

6. The ink jet recording sheet as claimed in claim 1, wherein the polymeric film for the substrate is selected from biaxially oriented films comprising an inorganic pigment and a thermoplastic resin.

7. The ink jet recording sheet as claimed in claim 1, wherein the pigment particles for the undercoat layer are inorganic pigment particles.

8. The ink jet recording sheet as claimed in claim 7, wherein the inorganic pigment particles for the undercoat layer are calcium carbonate particles.

9. The ink jet recording sheet as claimed in claim 1, wherein the undercoat layer is present in an amount of 0.5 to 8 g/$m^2$.

* * * * *